Sept. 25, 1956
P. PÊGARD
2,764,133
HYDRAULICALLY AND ELECTRICALLY CONTROLLED MECHANICAL DRIVE
Filed Aug. 22, 1952
2 Sheets-Sheet 1
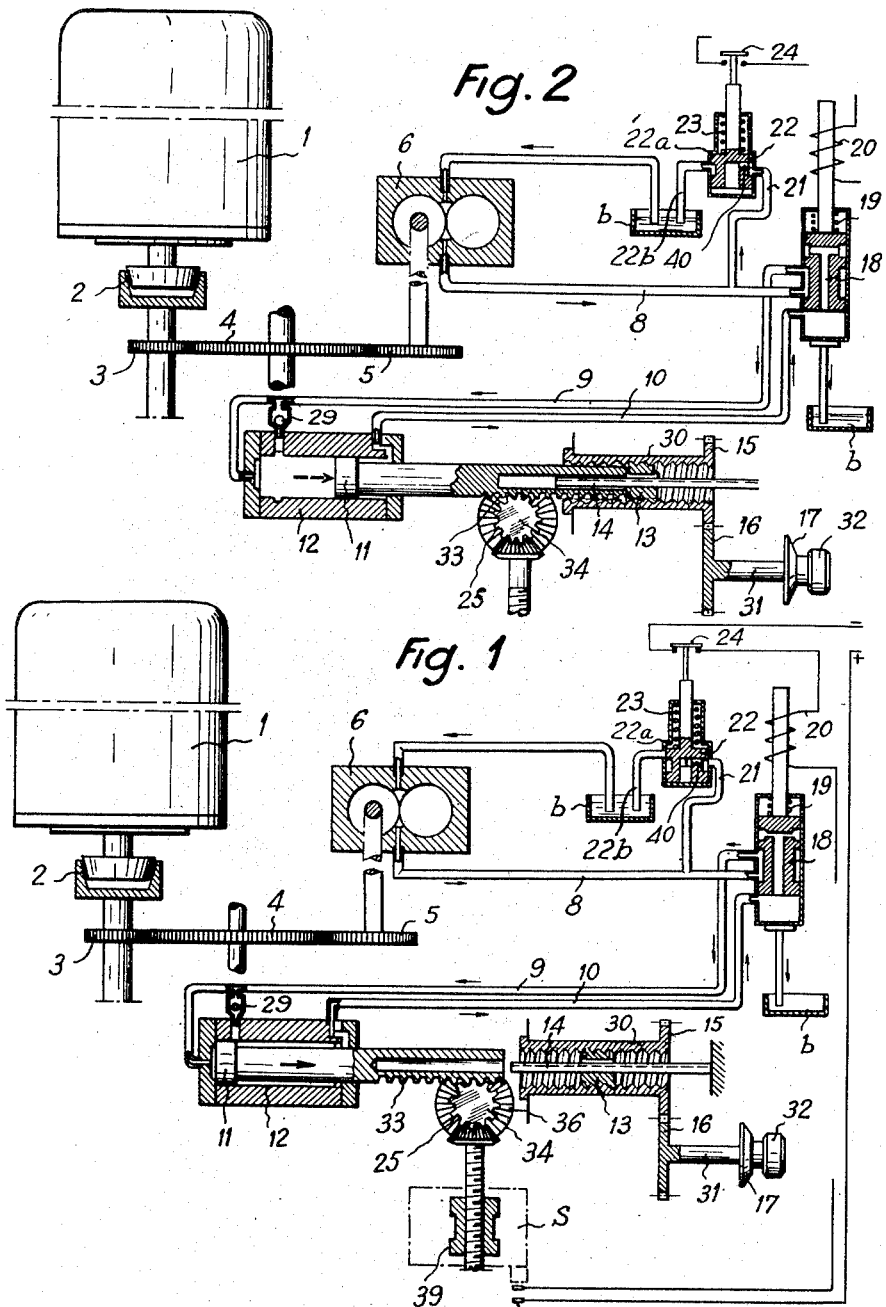
Inventor
Pierre Pegard
By Robert E. Burns
Attorney Sept. 25, 1956 P. PÊGARD 2,764,133
HYDRAULICALLY AND ELECTRICALLY CONTROLLED MECHANICAL DRIVE
Filed Aug. 22, 1952 2 Sheets-Sheet 2
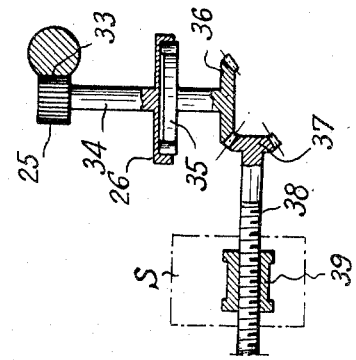
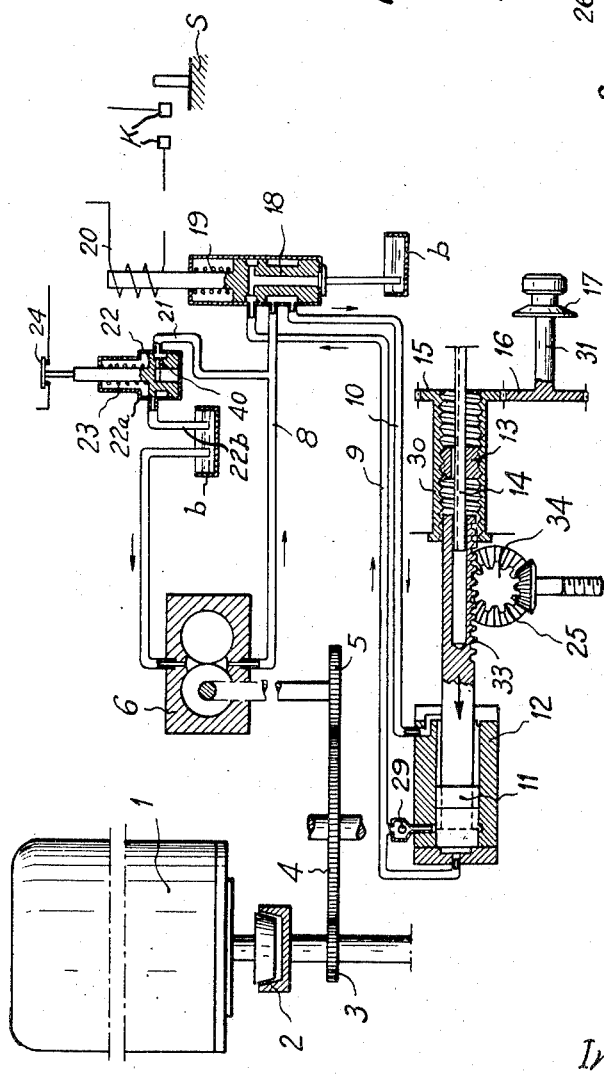
Inventor
Pierre Pegard
By Robert E. Burns
Attorney

United States Patent Office 2,764,133
Patented Sept. 25, 1956

2,764,133

HYDRAULICALLY AND ELECTRICALLY CONTROLLED MECHANICAL DRIVE

Pierre Pêgard, Courbevoie, France, assignor to The Society Ateliers G. S. P.-Guillemin-Sergot-Pegard, Courbevoie, France Application August 22, 1952, Serial No. 305,887

Claims priority, application France August 25, 1951

2 Claims. (Cl. 121—45)

The present invention has for its object a hydraulic-mechanical-electric arrangement for imparting to a movable member a reciprocating motion or an intermittent displacement.

This arrangement has numerous applications, but it is more particularly applicable to machine-tools, notably for producing the advance of certain movable members, either the table, or the tool holder, etc. . . , according to the machine.

The arrangement is characterized by the combination of a pilot valve actuated by an electromagnet which is energized by the action of an electric contact of a movable part of the machine, at the end of its run, of a second valve actuated by the pressure of the liquid in the piping, and of a piston which is movable in one direction and in the other by the liquid pressure, according to the condition of the distribution of the liquid at each instant, this piston acting upon the member to be displaced. When one desires to obtain an intermittent advance of a member, the above-mentioned piston acts on the member to be moved through the intermediary of a system of the free wheel type.

The accompanying drawing represents in a non-limitative manner an embodiment of the invention for use when one desires to obtain an intermittent advance.

Fig. 1 is a diagrammatic view of the entire arrangement of the invention;

Figs. 2 and 3 are similar views showing the parts in different positions;

Fig. 4 is a partial plan view.

As seen in the drawing, the arrangement illustrated comprises a motor 1 which, through the intermediary of a coupling 2 and of a gear train 3, 4, 5, drives a pump 6. This pump draws oil from a tank $b$ and forces it through a pipe 8 which may be put in communication with the pipes 9 and 10 by a pilot valve 18. The oil under pressure will cause movement of a piston 11 in cylinder 12. The movement of the piston 11 is limited by a stop nut 13, which is adjustable, and is adapted to slide without turning on a fixed rod 14. The right hand end of the piston is recessed in order to allow it to reach the stop nut without interference by the rod 14. A sleeve 30 is threadedly engaged with the stop nut 13, forming a screw, this sleeve being integral with a pinion 15 meshing with another pinion 16 keyed on a shaft 31 which is provided with a control knob 32 and a vernier 17 to permit the reading of the extent of the movable member driven by piston 11. The portion of the piston 11 which is inside the cylinder 12 is cut in the form of a rack 33 meshing with a pinion 25, as seen in Fig. 4. This pinion is keyed on a shaft 34 which is integral with the external portion 26 of a free wheel, the internal portion 35 of which is integral with a bevel pinion 36 meshing with another pinion 37 unitary with a screw 38 passing through a nut 39 connected with the member S to be displaced which is, for example, the support of the tool.

The pilot valve 18 is subjected to the action of a spring 19 which tends to lower it and to the action of an electromagnet 20 which lifts it when it is energized.

In the circuit of the electromagnet 20 is inserted a contact switch 24 controlled by the piston 22 slidable in a cylinder 22a which communicates by means of a pipe 22b with tank $b$. The piston 22 is pushed downwards by a spring 23. It is adapted to be lifted by the pressure of the oil flowing through branch pipe 21 which communicates with the interior of cylinder 22a and passing through a calibrated orifice 40 extending through the wall of piston 22. The pipe 22b is related to the piston 22 in such manner that oil entering through orifice 40 will be discharged into tank $b$ when piston 22 is lifted against the action of spring 23 upon increase in pressure of the oil as shown in Fig. 2. Also included in the circuit of the electromagnet 20 is a contact switch K which is in the path of the machine table or other member S being actuated and is engaged by this member at the end of its run. Thus, the contact switch K when actuated makes the circuit, including the electromagnet 20 to energize the electromagnet and the contact switch 24 breaks the circuit to the electromagnet to de-energize the electromagnet at the proper time in the cycle. It will be understood that, as in conventional circuits involving make and break contact switches, there are suitably provided relays of known type to hold the circuit open or to hold the circuit closed until one of the contact switches is again actuated.

The device functions as follows:

The motor drives the pump 6. Assuming that the pilot valve 18 is in its low position, as seen in Figure 3. The oil forced by the pump through the pipe 8 passes into the pipe 10 and maintains the piston 11 in its extreme left-hand position, a neutral position indicated by broken lines in Fig. 3. In this position, the oil lifts the ball 29 and returns to the tank $b$ by the pipe 9.

When the table, or other member of the machine in motion, arrives at the end of its run, it acts, by an adjustable lug, on a contact which closes the circuit of the electromagnet 20. The latter attracts the piston 18 upwardly, compressing the spring 19 in so doing. The piston takes the position shown in Fig. 1, in which the pipe 8 is in communication with the pipe 9. The oil under pressure in pipe 9 acts in the direction of the arrows, Fig. 1, and pushes the piston 11 towards the right until it is stopped by the stop 13. The rack 33 causes the piston 25 to turn and the free wheel drives in this direction the screw 38. The member S is therefore displaced.

The amount of the advance thus imparted to this member depends on the position given to the stop 13.

At the moment when the piston 11 is stopped by the stop 13, the position shown in Fig. 2, there occurs an excess of pressure in the oil circuit, which lifts the piston 22 and breaks the contact 24. The electromagnet 20 is de-energized and allows the valve 18 to resume the lowered position shown in Fig. 3. The oil can therefore pass through pipes 8 and 10 and displace the piston 11 towards the left.

At this movement, the rack 33 causes the pinion 25 to turn, but in this direction the free wheel does not drive the pinion 36. The member S remains motionless.

At the end of the run, the oil lifts the ball 29 and proceeds to exhaust. The pressure falls, the piston 22 descends again and makes electrical contact. Everything is in its original position and the cycle of operations is completed.

When the movable member causes its contact to close again, the cycle begins again.

The arrangement of the invention has the advantage of permitting the control of the displacement of a movable member by an independent pump-driven motor assembly, which may be placed either on the bed of the member to be displaced or separately, the connection between this motor assembly and the receiving assembly being provided by the pipes 9 and 10.

On the other hand, the control of the movement taking place by action on an electric contact, it is possible to adjust the controlling impulse at any point of the cycle of the controlling member. It is also possible to give several impulses in the same cycle (for example, in the case of the control of the advances of the tool-carriers of a reciprocating planing machine cutting on both strokes, the advance impulses being given by the table).

The above arrangements are only given by way of example. All the details of execution, shapes, sizes and materials employed may vary in all cases without affecting the principle of the invention.

In the claims:

1. An electrically-controlled, hydraulically-actuated apparatus for imparting an intermittent unidirectional motion to a movable member which comprises a cylinder, a piston movable in said cylinder, unidirectional moving means connecting said piston to said movable member, means for admitting to said cylinder a fluid under pressure to effect reciprocation of said cylinder in a forward driving movement and in a return movement, and adjustable stop means for limiting the forward driving movement of said piston, said last-named means comprising a threaded screw and a nut threadedly engaged therewith in the path of the piston, means for imparting relative rotational movement to the screw for adjusting the relative positions of the screw and the nut, said screw being cylindrical and said nut being threadedly engaged in the interior of said screw, a fixed rod extending axially through said screw with said nut slidable thereover and said piston having an extension extending into said screw, said extension being formed with an axial recess for reception of said fixed rod upon reciprocation of said piston.

2. An adjustable stop control for the piston of a fluid motor comprising a hollow screw mounted at the forward end of said piston and adapted slidably to receive said forward end, a nut threadedly engaged with the interior of said screw in the path of said piston, a fixed rod extending axially through said screw and said nut for sliding engagement with said nut, and the forward end of said piston being formed with an axial recess for reception of said fixed rod, and means for imparting relative rotational movement to the screw for adjusting the relative positions of the screw and the nut.

References Cited in the file of this patent

UNITED STATES PATENTS

| Number | Name | Date |
|---|---|---|
| 444,016 | Puetz | Jan. 6, 1891 |
| 1,923,786 | Knowles | Aug. 22, 1933 |
| 1,927,583 | Ernst | Sept. 19, 1933 |
| 1,938,758 | Ernst | Dec. 12, 1933 |
| 2,049,611 | Harrison | Aug. 4, 1936 |
| 2,396,495 | Drake | Mar. 12, 1946 |
| 2,398,178 | Ellison | Apr. 9, 1946 |
| 2,450,972 | Le Tourneau | Oct. 12, 1948 |
| 2,491,402 | Tucker | Dec. 13, 1949 |
| 2,529,777 | McInnis | Nov. 14, 1950 |
| 2,605,748 | Rasoletti | Aug. 5, 1952 |
| 2,613,703 | Calvert | Oct. 14, 1952 |
| 2,615,302 | Camerota | Oct. 28, 1952 |
| 2,646,074 | Hopkins | July 21, 1953 |